K. VON KANDÓ.
ELECTRIC VEHICLE MOTOR SUSPENSION.
APPLICATION FILED MAY 4, 1908.

989,610.

Patented Apr. 18, 1911.

2 SHEETS—SHEET 1.

WITNESSES:
C. L. Belcher
R. J. Dearborn

INVENTOR
Kalman von Kandó
BY
Wesley G. Carr
ATTORNEY

K. VON KANDÓ.
ELECTRIC VEHICLE MOTOR SUSPENSION.
APPLICATION FILED MAY 4, 1908.

989,610.

Patented Apr. 18, 1911.
2 SHEETS—SHEET 2.

WITNESSES:
C. L. Belcher
R. J. Dearborn

INVENTOR
Kalman von Kandó
BY
Wesley Gloan
ATTORNEY

UNITED STATES PATENT OFFICE.

KALMAN von KANDÓ, OF VADO LIGURE, ITALY, ASSIGNOR TO GEORGE WESTINGHOUSE.

ELECTRIC-VEHICLE-MOTOR SUSPENSION.

989,610.  Specification of Letters Patent.  Patented Apr. 18, 1911.

Application filed May 4, 1908. Serial No. 430,792.

*To all whom it may concern:*

Be it known that I, KALMAN VON KANDÓ, a subject of the Emperor of Austria-Hungary, and a resident of Vado Ligure, in the Kingdom of Italy, have invented a new and useful Improvement in Electric-Vehicle-Motor Suspension, of which the following is a specification.

My invention relates to electrically driven vehicles in which electric motors are connected to the driving wheels by means of cranks and connecting rods, and it has for its object to provide an improved combination of parts for supporting the motor.

It has heretofore been proposed to provide one set of bearings for maintaining a concentric relation between the rotor and the stator of a vehicle-propelling motor having the above-mentioned driving connections, and a second set of bearings located in the frame of the vehicle by which the crank thrust is transferred to the frame, the weight of the stator being borne by springs connected to the frame in order to relieve the first set of bearings from stress.

With the arrangement above indicated, it has been observed that the bearings for maintaining a concentric relation of the rotor and the stator are subjected to stress on account of the torque exerted on the stator.

The object of the present invention is to so suspend an electric motor having a crank shaft provided with bearings in the frame of the vehicle and also in the stator that the inner bearings which maintain the proper relation between the stator and the rotor shall be entirely relieved of load.

The characteristic feature of the improved arrangement consists in so supporting the stator that it will be capable of oscillation or of free movement only in a horizontal direction upon a frame which is adapted to move only in a vertical direction and is mounted on springs capable of sustaining the weight of the stator.

Figure 1:
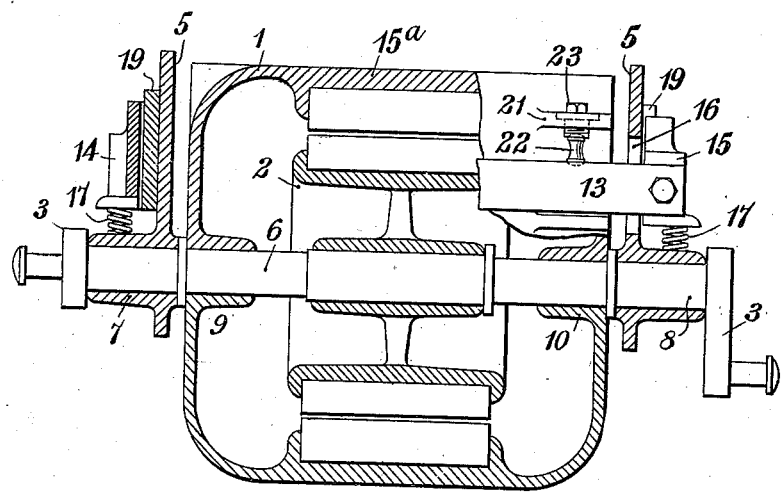
Figure 2:
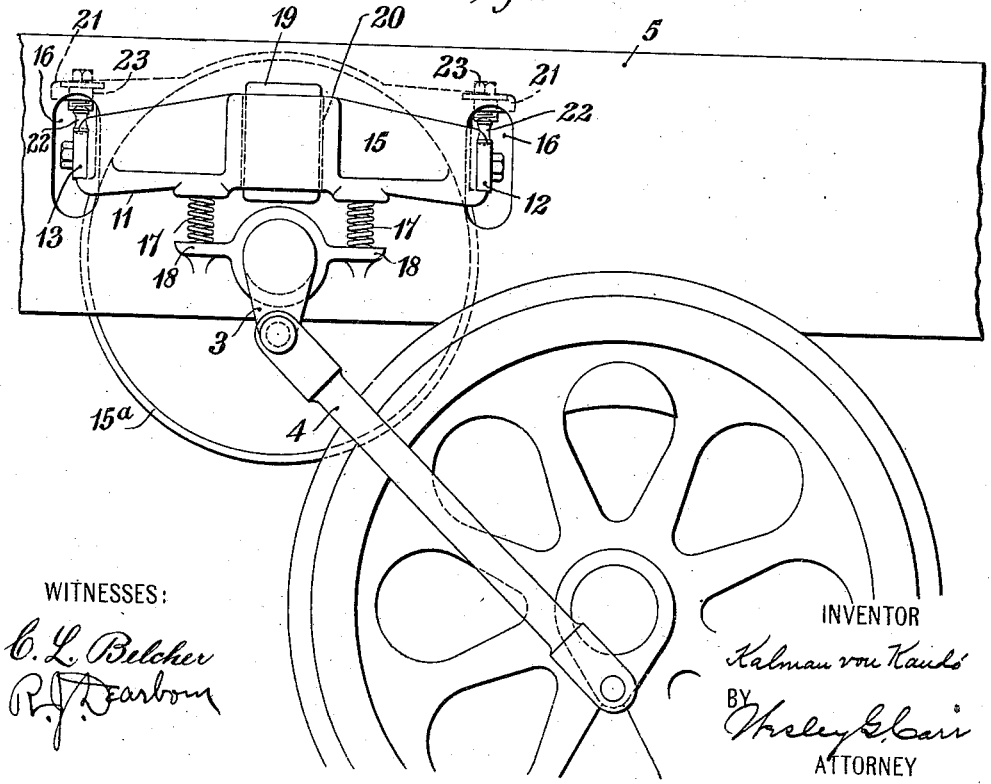
Figure 3:
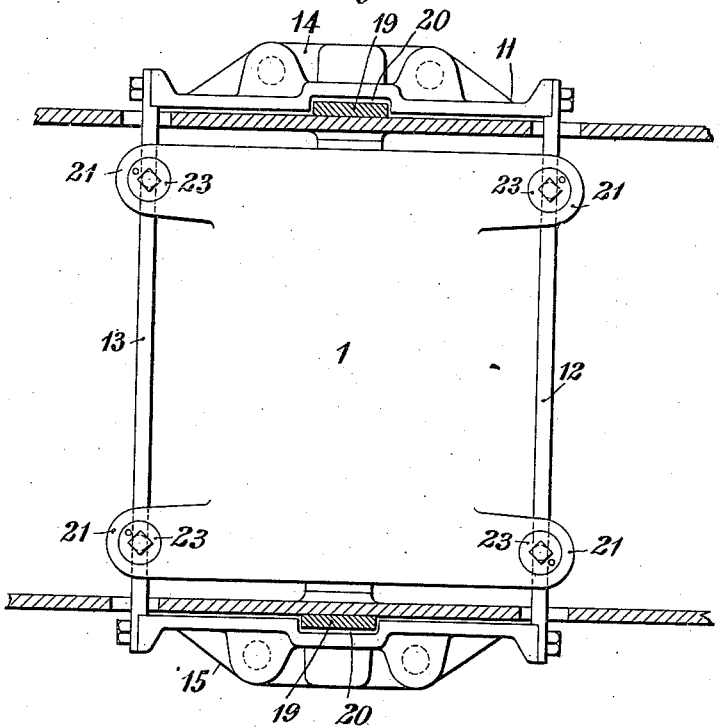
Figure 4:
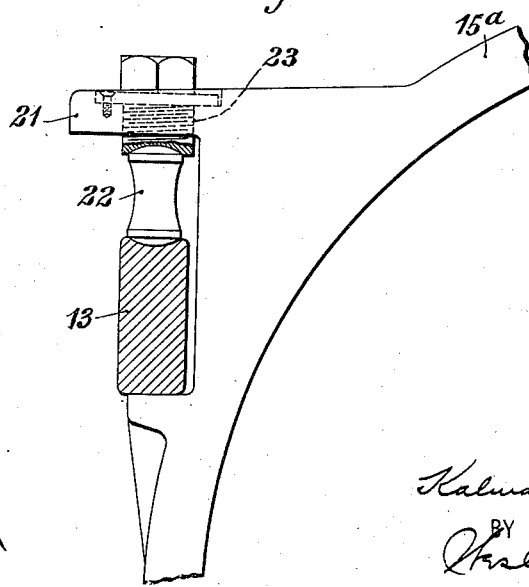

In the accompanying drawings, Figure 1 is a sectional elevation of a motor suspended according to my invention. Figs. 2 and 3, are respectively, an end elevation and a plan view of the motor and supporting truck or frame shown in Fig. 1, and Fig. 4 is a detail view, on a larger scale, of the structure shown in the other figures.

Referring to the drawings, a vehicle motor, comprising a stationary member or stator 1 and a rotating armature or rotor 2, is adapted to drive an electric vehicle, such as a car or locomotive, by means of a crank 3 and a connecting rod 4, a portion of the vehicle frame 5 being shown in the drawings.

The rotor 2 is mounted on a shaft 6 which is journaled in bearings 7 and 8 in the vehicle frame 5 and the desired concentric relation is maintained between the stator and the rotor by means of inner bearings 9 and 10 which are provided at the ends of the stationary frame and through which the shaft 6 extends. The weight of the stator is, however, borne by a cradle 11 comprising a pair of cross-bars 12 and 13 and end girders 14 and 15. The cross-bars 12 and 13 extend through relatively large openings 16 in the vehicle frame 5 and the end girders are located outside of the walls of the frame, from which they are resiliently supported by means of springs 17. The springs 17 are seated on brackets 18 which are integral with the side walls of the vehicle frame and extend outwardly therefrom. In order to prevent a rotative movement of the cradle and to provide for its vertical movement, vertical guide strips 19 are provided on the vehicle frame and grooves 20, which coöperate therewith, are cut in the inner surfaces of the end girders 14 and 15.

The motor frame 15ª, which forms a part of the stator, is provided with ear projections 21 which extend over the cross-bars 12 and 13 and serve to support the motor, bolsters 22 being interposed between the two parts to permit of an oscillation of the stator in a horizontal plane or a certain amount of lateral adjustment between the motor frame and the cradle. The bolsters might, of course, be omitted, in which case, the ears 21 would rest directly on the cross-bars 12 and 13. As shown in Fig. 4, the bolsters 22 are provided with spherically curved end surfaces which are seated in suitable indentations in the cross-bars and in adjustable bearing cups 23 in the ears.

It will be understood that structural modifications may be effected within the spirit and scope of my invention, and I desire that only such limitations shall be imposed as are indicated in the appended claims.

I claim as my invention:

1. In a vehicle, the combination with a frame structure, a motor comprising a stator and a rotor, a cradle in which the stator is loosely supported, and springs interposed between the cradle and the frame structure.

2. In a vehicle, the combination with a vehicle frame, a driving motor comprising a stator and a rotor, and rotor bearings for maintaining the concentric relation of the two parts, of a cradle in which the motor is loosely mounted, and supporting springs interposed between the cradle and the vehicle frame.

3. In an electric vehicle, the combination with a body frame, a driving motor comprising a stationary member and a rotary member, and a cradle for supporting the stationary member, of resilient means interposed between the cradle and the frame, bearings for maintaining a concentric relation between the two members of the motor, and other bearings in the vehicle body frame for the rotary member.

4. In an electric vehicle, the combination with a body frame having side walls, a cradle resiliently supported by said side walls and vertically movable relative thereto, of an electric driving motor comprising a stationary member mounted for limited horizontal movement relative to the cradle, a rotary member journaled in the side walls of the vehicle body frame, and inner bearings for maintaining a concentric relation between the members of the motor.

5. In an electric vehicle, the combination with a vehicle body frame having side walls, driving wheels for said vehicle, and an electric propelling motor comprising a stationary member and a rotary armature, and cranks and connecting rods between the armature shaft and said wheels, of a cradle for supporting the stationary member of the motor, said cradle being resiliently supported by the side walls of the body frame and vertically movable relative thereto, bolsters so interposed between the motor frame and the cradle as to permit a limited horizontal movement of the motor relative to the cradle, outer bearings in the vehicle frame for the armature shaft, and inner bearings in the motor frame for maintaining a concentric relation between the members of the motor.

6. In an electric vehicle, the combination with a truck frame and a cradle having its end members outside the truck frame, of an electric motor having its stator supported upon the side members of the cradle, and springs interposed between the cradle and the truck frame.

7. In an electric vehicle, the combination with a truck frame having vertical guide pieces, of a cradle having end members provided with recesses to engage the truck frame guide pieces, an electric motor having its stator supported upon the side members of the cradle, and springs interposed between the cradle and the truck frame.

8. In an electric vehicle, the combination with a truck frame and a cradle the end members of which have a vertical guide engagement with said truck frame, of an electric motor having its stator mounted in said cradle, and springs interposed between the cradle and the truck frame.

9. In an electric vehicle, the combination with a truck frame, and a cradle mounted for vertical movement in said frame, of an electric motor having its stator mounted in said cradle and adapted to have a limited longitudinal movement therein, and springs interposed between the cradle and the truck frame.

KALMAN von KANDÓ.

Witnesses:
G. SCIELLO,
ANGELO BORAZINO.

---

Copies of this patent may be obtained for five cents each, by addressing the "Commissioner of Patents, Washington, D. C."